United States Patent [19]

Speranza et al.

[11] Patent Number: 5,053,484

[45] Date of Patent: Oct. 1, 1991

[54] POLYETHER AMIDE FROM MIXTURE OF POLYETHER DIAMINE

[75] Inventors: George P. Speranza; Wei-Yang Su, both of Austin; Donald H. Champion, Pflugerville, all of Tex.

[73] Assignee: Texaco Chemical Company, White Plains, N.Y.

[21] Appl. No.: 507,261

[22] Filed: Apr. 10, 1990

[51] Int. Cl.$^5$ .............................................. C08G 69/40
[52] U.S. Cl. .................................. 528/338; 528/335; 528/339; 528/340; 528/347
[58] Field of Search ............... 528/340, 335, 338, 339, 528/347

[56] References Cited

U.S. PATENT DOCUMENTS 4,713,437 12/1987 Pilz et al. ............................ 528/335

FOREIGN PATENT DOCUMENTS 948507 2/1964 United Kingdom.

Primary Examiner—Harold E. Anderson
Attorney, Agent, or Firm—Jack H. Park; Kenneth R. Priem; David L. Mossman

[57] ABSTRACT

Novel polyether amides are produced by reacting a polyethylene glycol diamine and a first dicarboxylic acid or an ester thereof, with a polyoxyalkylene diamine of molecular weight of at least 500 and a second dicarboxylic acid or an ester thereof, where the polyethylene glycol diamine has the formula $NH_2-(CH_2CH_2O)_x-CH_2CH_2-NH_2$, where x ranges from 2 to 6, and where the first and second dicarboxylic acid may be the same or different. Suitable dicarboxylic acids include adipic acid, azelaic acid, sebacic acid, dodecanedioic acid, terephthalic acid, isophthalic acid, t-butyl isophthalic acid, and mixtures thereof. Suitable polyethylene glycol diamines include triethylene glycol diamine (JEFFAMINE® EDR—148 Amine) and tetraethylene glycol diamine (JEFFAMINE® EDR—192 Amine), among others. Higher molecular weight polyether diamines are used in addition to these polyethylene glycol diamines to give polyether amides useful in making polymers, including fibers, having unusually good water absorbancy properties. The polyether amides are made by mixing equimolar salts of diamine/diacid pairs and then heating the mixture to condense to the polymer.

16 Claims, No Drawings

POLYETHER AMIDE FROM MIXTURE OF POLYETHER DIAMINE

CROSS-REFERENCES TO RELATED APPLICATIONS

This application is related to U.S. patent application Ser. No. 07/506,990, filed of even date, relating to novel polyether amides and methods therefor, and U.S. patent application Ser. No. 07/506,988, filed of even date, relating to water soluble polyether amides produced by reacting tetraethylene glycol diamine with aromatic diacids.

FIELD OF THE INVENTION

The invention relates to novel polyamides, and, in one aspect, more particularly relates to novel water soluble polyether amides prepared by the reaction of dicarboxylic acids with polyethylene glycol diamines.

BACKGROUND OF THE INVENTION

Triethylene and tetraethylene glycol diamines may be continuously produced from glycols catalytically. The triethylene glycol diamine and tetraethylene glycol diamine products are known under the trade names JEFFAMINE ® EDR-148 Amine and JEFFAMINE ® EDR-192 Amine, respectively, as made by Texaco Chemical Co. These materials are useful as epoxy curing agents.

It is, of course, known to react materials having primary amine groups, with compounds having carboxylic acid groups.

Of particular interest is U.S. Pat. No. 2,359,867 which teaches polymers having a high receptivity for acid dyes, which polymers are the reaction product of 75 to 95 parts by weight of a mixture of hexamethylene-diamine and adipic acid in substantially equal proportions, and 5 to 25 parts by weight of a polyamide-forming composition selected from the class of (a) mixtures of diamine and dibasic carboxylic acid in substantially equimolecular proportions, and (b) monoaminomonocarboxylic acids. The polyamide-forming composition has a bifunctional polyamide-forming reactant containing at least one oxygen atom in the chain of atoms separating its amide-forming groups. Such polyamide forming reaction may include compounds of the formula $NH_2-(CH_2CH_2O)_x-CH_2CH_2-NH_2$, where x ranges from 2 to 3. Also of interest is S. Iwabuchi, et al., "Darstellung und Eigenschaften von Copolyamiden mit Oxyethylenegruppen in definierter Sequenz," *Makromol. Chem.*, Vol. 183, (1982) pp. 1427–1433. The summary to the article indicates that polyamides of the formula:

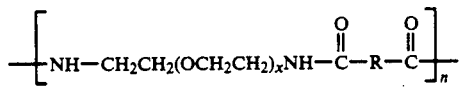

were synthesized from α,ω-diamino-substituted oligo-(oxyethylene)s and bis-chlorides of dicarboxylic acids. The copolymers contained up to five oxyethylene units per repeating unit, and properties like solubility, thermal stability and complexing ability towards alkali metal cations were influenced.

A crystalline polyamide which has improved tensile strength and which has a heat deflection temperature in excess of 240° C. when filled is formed from dicarboxylic acid compounds comprising compounds of terephthalic acid and isophthalic acid in a molar ratio of at least 80:20 to about 99:1 and diamines comprising hexamethylene diamine and trimethylhexamethylene diamine in a molar ratio of about 98:2 to about 60:40, according to U.S. Pat. No. 4,617,342.

These kinds of materials may be used for hot melt adhesives. For example, U.S. Pat. No. 4,656,242 describes that poly(ester-amide) polymers made from an acid component and a substantially equivalent amount of an amine and a diol component are suitable as hot melt adhesives for bonding plastics. The acid component has 10-80 equivalent percent of a dimer acid having about 36 carbon atoms and 40-90 equivalent percent of a linear dicarboxylic acid. The amine and diol component has from 40-90 equivalent percent of an organic diamine and 10-60 equivalent percent of a diol. Also of interest is U.S. Pat. No. 4,611,051 which teaches poly(ester-amide) hot-melt adhesives prepared from condensation of a mixture of polymeric fatty acids and 1,18-octadecanedicarboxylic acid, and a substantially equivalent proportion of a mixture of a polyamine and a polyol. Suitable polyamines include ethylenediamine, 1,3-propanediamine, 1,4-butanediamine, 1,6-hexamethylene-diamine, piperazine, and 4,4'-methylene-bis-(cyclohexylamine). Appropriate diols are ethylene glycol, 1,3-propanediol, 1,4-butanediol, 1,6-hexamethylenediol, cyclohexanemethanol, polyethylene glycol and polybutylene glycol.

See also *Chemical Abstracts*, Vol. 31: 769 ¶ 9 (1946) reporting Great Britain Patent 562,370 which describes a mixture of at least two preformed synthetic linear polyamides heated in the molten state at amide-forming temperatures until a homogeneous melt blend was obtained. At least one of the polyamides should be soluble in water and the other insoluble. The insoluble polyamide may be polyhexamethylene adipamide. The soluble polyamide may be one in which heteroatoms of oxygen or sulfur are present in the main polyamide chain, such as polytriglycol adipamide and N-methylpolytriglycol adipamide. The resultant polyamides had increased water-absorption properties and improved physical properties.

A good, general background article about some of these amide materials is J. R. Flesher, Jr., "Polyether Block Amide: High-Performance TPE," *Modern Plastics*, September, 1987, pp. 100–110, where the family of engineering-grade thermoplastic elastomers based on block copolymers of polyethers and polyamides is discussed.

Although polyamides have been incrementally improved as shown by the publications discussed above as examples, there remains a need for new polyamides having improved water absorbancy, but which retain the beneficial properties of polyamides.

SUMMARY OF THE INVENTION

Accordingly, it is an object of the present invention to provide novel polyether amides in which the ease of solubility in water is greatly enhanced.

It is another object of the present invention to provide novel polyether amides made form polyethylene glycol diamines and dicarboxylic acids.

Another object of the invention to provide a plurality of methods for making these novel materials that are easily implemented.

In carrying out these and other objects of the invention, there is provided, in one form, novel polyether amides produced by reacting a polyethylene glycol diamine and a first dicarboxylic acid or an ester thereof, with a polyoxyalkylene diamine of a molecular weight of at least 500 and a second dicarboxylic acid or an ester thereof, where the polyethylene glycol diamine has the formula $NH_2-(CH_2CH_2-O)_x-CH_2CH_2-NH_2$, where x ranges from 2 to 6, and where the first and second dicarboxylic acid may be the same or different.

DETAILED DESCRIPTION OF THE INVENTION

It has been discovered that the polyethylene glycol diamines, such as JEFFAMINE ® EDR amines, in particular triethylene glycol diamine and tetraethylene glycol diamine, as well as others, may be advantageously reacted with dicarboxylic acids in various ways to form novel polyether amides. These novel polyether amides are useful in applications where good water absorption is desired, such as fabrics, where it is known that some incorporation of moisture is useful in reducing the tendency of the fabric to carry an undesirable static charge.

The novel polyether amides of this invention may be made by reacting a first diamine with a first dicarboxylic acid to form a first reaction product and a second diamine with a second dicarboxylic acid to form a second reaction product, and then reacting the two products together to form the novel polyether amides. One of the diamines should be a polyethylene glycol diamine of the formula $NH_2-(CH_2CH_2O)_x-CH_2CH_2-NH_2$, where x ranges from 2 to 6. The value of x preferably ranges from 2 to 5, and most preferably from 2 to 3. When x is 2 and 3, the compounds are triethylene glycol diamine (JEFFAMINE EDR-148 amine) and tetraethylene glycol diamine (JEFFAMINE EDR-192 amine), respectively.

The polyether amides of this invention must use the polyethylene glycol diamines defined above. However, they should also use a polyoxyalkylene diamine in conjunction with these. These polyoxyalkylene diamines should have a molecular weight of at least 500, and preferably have a greater portion of polyoxyethylene units relative to other polyoxyalkylene units that are present. The diamines are greatly preferred to consist of mixed polyoxyalkylene units, e.g. polyoxyethylene and polyoxypropylene units. Useful higher molecular weight polyoxyalkylene diamines include, for example, those having the formula $H_2NRNH_2$, where the radical R is a polyoxyalkylene chain of molecular weight of from about 450 to about 4000 having terminal carbon atoms to which nitrogen atoms are bonded. The radical R may have the formula:

$$-[CH(CH_3)CH_2O]_y(CH_2CH_2O)_z[CH_2CH(CH_3)O]_{y-1}CH_2CH(CH_3)-$$

where y ranges from 1 to about 5, preferably 1 to about 3, and z ranges from 1 to 90.

Typical polyoxyalkylene diamines of the above type which are commercially available include, but are not necessarily limited to:

a. The diterminal diamine of mixed polyoxypropylene and polyoxyethylene of molecular weight 600. As marketed under the trademark JEFFAMINE ® ED-600 by Texaco Chemical Co., the average value in the formula above for y is 1.50 and z is 8.70.

b. The diterminal diaminal diamine of mixed polyoxypropylene and polyoxyethylene of molecular weight 900. As marketed under the trademark JEFFAMINE ® ED-900 by Texaco Chemical Co., the average value in the formula above for y is 1.5 and z is 21.

c. The diterminal diamine of mixed polyoxypropylene and polyoxyethylene of molecular weight 2000. As marketed under the trademark JEFFAMINE ® ED-2001 by Texaco Chemical Co., the average value in the formula above for y is 1.50 and z is 41.8.

Of course, other amines may be used in addition to the ones required herein. For example, ethylene diamine and piperazine could also be added to a minor extent along with the JEFFAMINE EDR amines and JEFFAMINE ED amines. Another class of amines which can be used in conjunction with the lower molecular weight polyoxyalkylene diamines include the aminopropyl polyethylene oxy compounds of formula (I):

$$NH_2CH_2CH_2CH_2O(CH_2CH_2O)_x-OCH_2CH_2CH_2NH_2 \quad (I)$$

where x has a value of from 10 to 50. These products may be prepared by the addition of acrylonitrile to polyethylene glycols, followed by hydrogenation of the dinitriles, as by the following scheme:

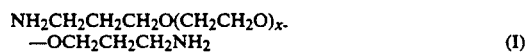

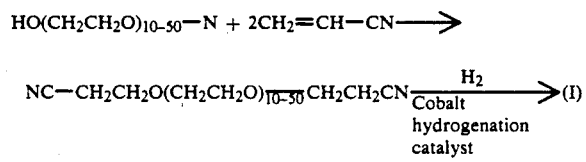

The dicarboxylic acids useful in the invention may have the formula HOOC—R—COOH, where R may be an alkyl or an aryl moiety having from 3 to 34 carbon atoms in one embodiment, in one aspect from 4 to 20 carbon atoms, and in a further aspect from 4 to 9. In another aspect of the invention, the dicarboxylic acid may be selected from the group including, but not necessarily limited to, adipic acid, pimelic acid, azelaic acid, sebacic acid, dodecanedioic acid, terephthalic acid, isophthalic acid, t-butyl isophthalic acid and mixtures thereof. The esters of these acids may also be used.

The polyether amides of the invention may be made by forming salts of the diamines and diacids in stoichiometric ratio, and then condensing the salts in the presence of heat, from approximately 220° to about 280° C. as a narrower range, where a broad temperature range for this reaction is from about 240° to about 270° C. No catalyst is required for this reaction, although one may be yet discovered that might prove beneficial. The reaction may also be conducted at atmospheric pressure, but also from a reduced pressure of 0.1 mm to 20 atmospheres. The reaction is quite selective, yielding the polyether amides in nearly quantitative yield.

The products are generally light-colored solids. The products and methods of this invention will be described in more detail with reference to the following examples. The use of the higher molecular weight polyoxyalkylene diamines makes the products water soluble to a greater extent. In other words, the products dissolve faster than those which contain less proportion of or no polyoxyalkylene diamine.

EXAMPLES 1-7

Reactions With Adipic Acid

Experiments were carried out to develop new water-soluble polyamides by introducing JEFFAMINE ED®-Series amines into the polyamide of JEFFAMINE EDR-148 amine with adipic acid. The resulting polyamides show increasing tendency for water solubility. It is clear that when increasing the amount of polyoxyethylene units of polyamides, the products show an increas-ing tendency to dissolve faster in water. The products are also more flexible compared with polyamides made from JEFFAMINE EDR-148 amine and adipic acid. This is further evidence that aliphatic ether linkages reduce the polymer crystallinity and increase the flexibility and water absorption of a polymer.

The following examples will illustrate how the polyether amides of the present invention may be prepared by forming the stoichiometric 1:1 salts of the polyethylene glycol diamine/dicarboxylic acid pairs and then performing the step-reaction (condensation) by heating to remove the water.

EXAMPLE 1

Reaction of JEFFAMINE ED-600.Adipic Acid Salt with a JEFFAMINE EDR-192.Adipic Acid Salt To a test tube was added JEFFAMINE ED-600 amine.adipic acid salt (1.0 g.) and JEFFAMINE EDR-148 amine.adipic acid salt (4.0 g.). The test tube was placed into a glass reactor equipped with a nitrogen purging tube. The reactor was heated to 170° C. for one hour and then 260° C. for four hours. A light brown elastomeric solid (4.2 g.) was recovered.

EXAMPLE 2

Reaction of JEFFAMINE ED-600.Adipic Acid Salt with a JEFFAMINE EDR-148.Adipic Acid Salt The procedure of Example 1 was followed except that 2.0 g. of JEFFAMINE ED-600 amine.adipic acid salt and 3.0 g. of JEFFAMINE EDR-148 amine.adipic acid salt were used. A light brown elastomeric solid (4.1 g.) was recovered.

EXAMPLE 3

Reaction of JEFFAMINE ED-600.Adipic Acid Salt with a JEFFAMINE EDR-148.Adipic Acid Salt The procedure of Example 1 was followed except that 3.0 g. of JEFFAMINE ED-600 amine.adipic acid salt and 2.0 g. of JEFFAMINE EDR-148 amine.adipic acid salt were used. A brown elastomeric solid (4.5 g.) was recovered.

EXAMPLE 4

Reaction of JEFFAMINE ED-600.Adipic Acid Salt with a JEFFAMINE EDR-148.Adipic Acid Salt The procedure of Example 1 was followed except that 4.2 g. of JEFFAMINE ED-600 amine.adipic acid salt and 2.1 g. of JEFFAMINE EDR-148.adipic acid salt were used. A brown elastomeric solid (5.8 g.) was recovered.

EXAMPLE 5

Reaction of JEFFAMINE ED-600.Adipic Acid Salt with a JEFFAMINE EDR-148.Adipic Acid Salt The procedure of Example 1 was followed except that 4.0 g. of JEFFAMINE ED-600 amine.adipic acid salt, 1.0 g. of JEFFAMINE EDR-148 amine.adipic acid salt and 0.01 g. of Ultranox 236 were used. A light brown elastomeric solid (4.5 g.) was recovered.

EXAMPLE 6

Reaction of JEFFAMINE ED-2001 and Adipic Acid with a JEFFAMINE EDR-148.Adipic Acid Salt The procedure of Example 1 was followed except that 5.2 g. of JEFFAMINE EDR-148 amine.adipic acid salt, 0.078 g. of adipic acid and 1.2 g. of JEFFAMINE ED-2001 amine were used. A yellow elastomeric solid (5.72 g.) was recovered.

EXAMPLE 7

Solubility Study

Normally, when water soluble polymers are discussed, what is meant is that the polymers are soluble in water at 2-5% levels. For example, a well-known procedure by A. E. Staley, et al. was followed. There technique for dissolving their experimental product C3-450 water soluble polymers follows:

"Typical preparation of a 2% solids aqueous solution of C3-450 involves:
1. Agitating 70°-90° F. water to create a slight vortex.
2. Carefully sifting C3-450 onto the water's surface.
3. Maintaining agitation of 30 minutes.

Higher solids concentration and/or cold make-up water require increased agitation time."

Polyether amides from Examples 4, 6 and JEFFAMINE EDR-148 amine.adipic acid (as standard) were cut into very fine slits. A hundred parts by weight of water were added, with stirring. Times for dissolving polyether amides were measured. The results are given in Table I. The same polyether amide of Example 4 (1 part and 10 parts of water) was dissolved in water in three minutes with shaking moderately.

TABLE I

| Solubility Study of Polyether Amides | | |
| --- | --- | --- |
| Polyether amide | | |
| Example 4 | Example 6 | Standard |
| Time (min.)  1.0 | 2.5 | 9.0 |

Many modifications may be made in the process and compounds of this invention without departing from the spirit and scope thereof which are defined only in the appended claims. For example, one skilled in the art may discover that particular reaction conditions, sequences, companion diamines, dicarboxylic acids, which may not be explicitly recited herein, but which are nevertheless anticipated, would give optimal or otherwise desirable results.

| GLOSSARY | |
| --- | --- |
| Jeffamine ® ED-600 Amine | A diterminal diamine of mixed polyoxypropylene and polyoxyethylene having a molecular weight of 600 made by Texaco Chemical Company. |
| Jeffamine ® Ed-900 Amine | A diterminal diamine of mixed polyoxypropylene and polyoxyethylene having a molecular weight of 900 made by Texaco Chemical Company. |
| Jeffamine ® ED-2001 Amine | A diterminal diamine of mixed polyoxypropylene and polyoxyethylene |

| GLOSSARY | |
|---|---|
| | having a molecular weight of 2000 made by Texaco Chemical Company. |
| Jeffamine ® EDR-148 Amine | Triethylene glycol diamine made by Texaco Chemical Company. |
| Jeffamine ® EDR-192 Amine | Tetraethylene glycol diamine made by Texaco Chemical Company. |

We claim:

1. A polyether amide produced by reacting a polyethylene glycol diamine and a first dicarboxylic acid or an ester thereof, with a polyoxyalkylene diamine of a molecular weight of at least 500 and a second dicarboxylic acid or an ester thereof, where the polyethylene glycol diamine has the formula $NH_2-(CH_2CH_2O)_x-CH_2-CH_2-NH_2$, where x ranges from 2 to 6, and where the first and second dicarboxylic acid are the same or different.

2. The polyether amide of claim 1 where the first and second dicarboxylic acids have the formula $HOOC-R-COOH$, where R is alkylene or arylene having from about 3 to about 34 carbon atoms, or esters thereof.

3. The polyether amide of claim 1 where x ranges from 2 to 3.

4. The polyether amide of claim 1 where the polyoxyalkylene diamine has the formula $H_2NRNH_2$, where the radical R is a polyoxyalkylene chain of molecular weight of from about 450 to about 4000 having terminal carbon atoms to which nitrogen atoms are bonded.

5. The polyether amides of claim 1 where the polyoxyalkylene diamine has both oxypropylene and oxyethylene groups.

6. A polyether amide made by the process comprising the steps of:
combining a first diamine with a first dicarboxylic acid, or an ester thereof, to form a first salt;
combining a second diamine with a second dicarboxylic acid, or an ester thereof, to form a second salt;
mixing the first salt and the second salt;
forming a polyether amide by reacting the first salt with the second salt by heating,
where one of the diamines has the formula $NH_2-(CH_2CH_2O)_x-CH_2CH_2-NH_2$, where x ranges from 2 to 6, the other of the diamines is a polyoxyalkylene diamine with a molecular weight of at least 500, and the first dicarboxylic acid and the second dicarboxylic acid, or ester thereof, are the same or different.

7. The polyether amide of claim 6 where the first dicarboxylic acid and the second dicarboxylic acid are different from one another and selected independetly from the group of dicarboxylic acids having the formula $HOOC-R-COOH$, where R is alkylene or arylene having from about 3 to about 34 carbon atoms, or esters thereof.

8. The polyether amide of claim 6 where in the formula $NH_2-(CH_2CH_2O)_x-CH_2CH_2-NH_2$, x ranges from 2 to 3.

9. The polyether amide of claim 6 where at least one of the diamines has the formula $H_2NRNH_2$, where the radical R is a polyoxyalkylene chain of molecular weight of from about 450 to about 4000 having terminal carbon atoms to which nitrogen atoms are bonded.

10. The polyether amide of claim 6 where the polyoxyalkylene diamine oxypropylene and oxyethylene groups.

11. A process for making a polyether amide comprising the steps of:
combining a first diamine with a first dicarboxylic acid, or an ester thereof, to form a first salt;
combining a second diamine with a second dicarboxylic acid, or an ester thereof, to form a second salt;
mixing the first salt and the second salt;
forming a polyether amide by reacting the first salt with the second salt by heating,
where one of the diamines has the formula $NH_2-(CH_2CH_2O)_x-CH_2CH_2-NH_2$, where x ranges from 2 to 6, the other of the diamines is a polyoxyalkylene diamine with a molecular weight of at least 500, and the first dicarboxylic acid and the second dicarboxylic acid, or ester thereof, are the same or different.

12. The process of claim 11 where the reaction is conducted at a temperature between about 220° and 280° C.

13. The process of claim 11 where the first dicarboxylic acid and the second dicarboxylic acid are different from one another and selected independently from the group of dicarboxylic acids having the formula $HOOC-R-COOH$, where R is alkylene or arylene having from about 3 to about 34 carbon atoms, or esters thereof.

14. The process of claim 11 where in the formula $NH_2-(CH_2CH_2O)_x-CH_2CH_2-NH_2$, where x ranges from 2 to 3.

15. The process of claim 11 where at least one of the diamines has the formula $H_2NRNH_2$, where the radical R is a polyoxy-alkylene chain of molecular weight of from about 450 to about 4000 having terminal carbon atoms to which nitrogen atoms are bonded.

16. The process of claim 11 where the polyoxyalkylene diamine has both oxypropylene and oxyethylene groups.

* * * * *